(12) United States Patent
Eberle, III

(10) Patent No.: US 6,402,415 B1
(45) Date of Patent: Jun. 11, 2002

(54) ANCHORING BISCUIT DEVICE

(76) Inventor: Harry W. Eberle, III, 357 Vernoy Rd., Califon, NJ (US) 07830

( * ) Notice: Subject to any disclaimer, the term of this patent is extended or adjusted under 35 U.S.C. 154(b) by 0 days.

(21) Appl. No.: 09/186,741

(22) Filed: Nov. 5, 1998

Related U.S. Application Data

(63) Continuation-in-part of application No. 08/811,898, filed on Mar. 5, 1997, now abandoned.

(51) Int. Cl.⁷ .................................................. B25G 3/00
(52) U.S. Cl. .................. 403/231; 403/232.1; 403/408.1; 52/483.1
(58) Field of Search ................................ 403/230, 231, 403/232.1, 294, 298, 401, 408.1; 52/408, 483.1, 506.05, 586.1, 586.2, 585.1, 772

(56) References Cited

U.S. PATENT DOCUMENTS

| | | | | |
|---|---|---|---|---|
| 1,184,080 A | | 5/1916 | D'Arcy | |
| 2,332,081 A | | 10/1943 | Hunt et al. | 20/91 |
| 2,362,252 A | | 11/1944 | Ellinwood | 20/4 |
| 2,398,603 A | | 4/1946 | Soderberg | 85/49 |
| 2,406,387 A | | 8/1946 | Lank | 144/309 |
| 4,641,988 A | | 2/1987 | Ganner | 403/245 |
| 4,682,458 A | | 7/1987 | Sparrow | 52/309.8 |
| 5,004,027 A | | 4/1991 | Legler et al. | 144/136 R |
| 5,071,280 A | * | 12/1991 | Turner | 403/232.1 |
| 5,160,211 A | * | 11/1992 | Gilb | 403/232.1 X |
| 5,182,891 A | | 2/1993 | Slocum | 52/480 |
| 5,251,996 A | | 10/1993 | Hiller et al. | 403/406.1 |
| 5,377,732 A | | 1/1995 | Fujii et al. | 144/347 |
| 5,419,649 A | * | 5/1995 | Gilb | 403/232.1 X |
| 5,458,433 A | | 10/1995 | Stastny | 403/408.1 |
| 5,480,117 A | | 1/1996 | Fleming, III | 248/231.9 |
| 5,529,428 A | | 6/1996 | Bischof | 403/408.1 |
| 5,564,248 A | * | 10/1996 | Callies | 403/232.1 X |
| 5,603,580 A | * | 2/1997 | Leek et al. | 403/232.1 |
| 5,660,016 A | | 8/1997 | Erwin et al. | 52/483.1 |

FOREIGN PATENT DOCUMENTS

DE 372483 * 3/1923 ................. 403/408

* cited by examiner

*Primary Examiner*—Bruce A. Lev
(74) *Attorney, Agent, or Firm*—Kenneth P. Glynn, Esq.

(57) ABSTRACT

An anchoring biscuit device for joining three boards. It includes, (a) a first substantially flat horizontal top element having a generally biscuit-shaped configuration, (b) at least one substantially vertical support member attached to the underside of the top element and extending downwardly therefrom for a predetermined length for joinder of two adjacent boards which have been pre-cut with biscuit receiving slots, and, (c) an attachment orifice located at least on the top element for attachment of the anchoring biscuit device to a support board for anchoring and support of the two adjacent boards. In one preferred embodiment, a top bevel is included at the orifice to permit angled screwing at positions other than vertical positions. In other embodiments, the screw orifice will have an oval or elongated shape to likewise enable screwing at angles other than vertical. In yet another preferred embodiment, the orifice will both be beveled and elongated.

12 Claims, 3 Drawing Sheets

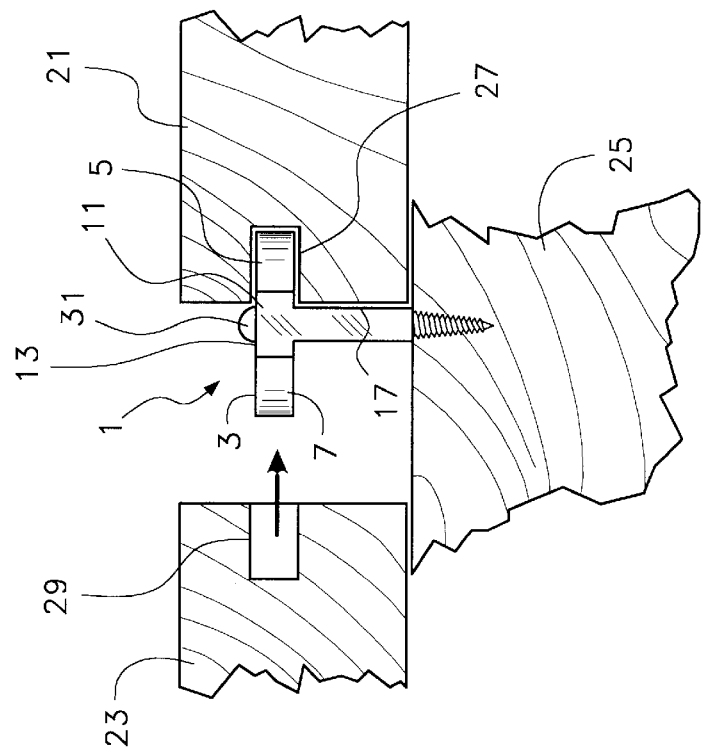
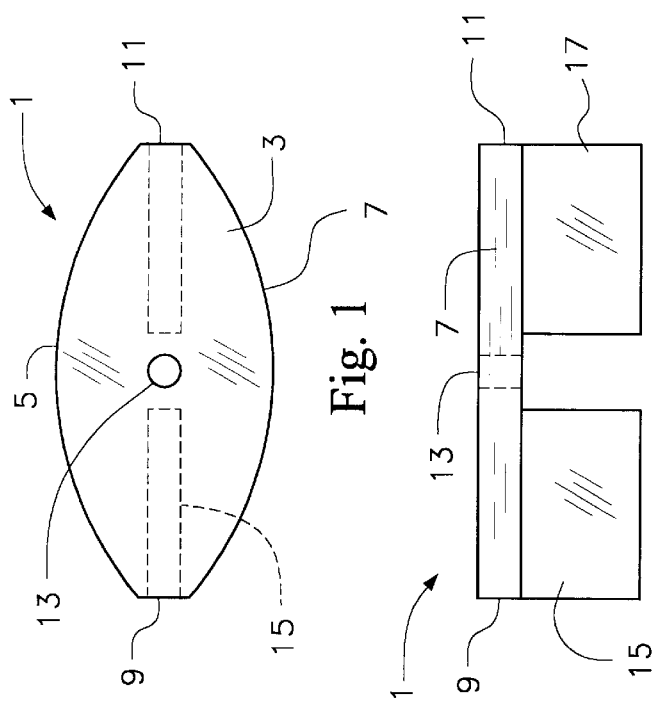
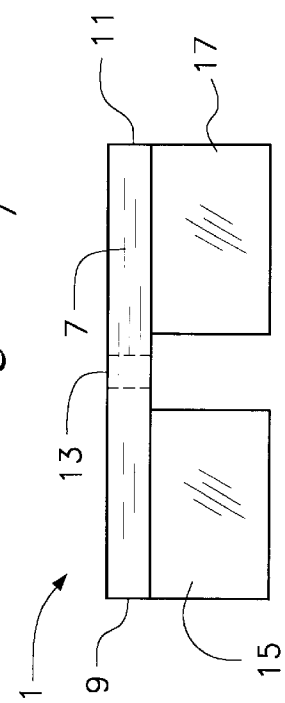
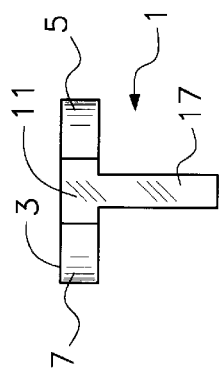

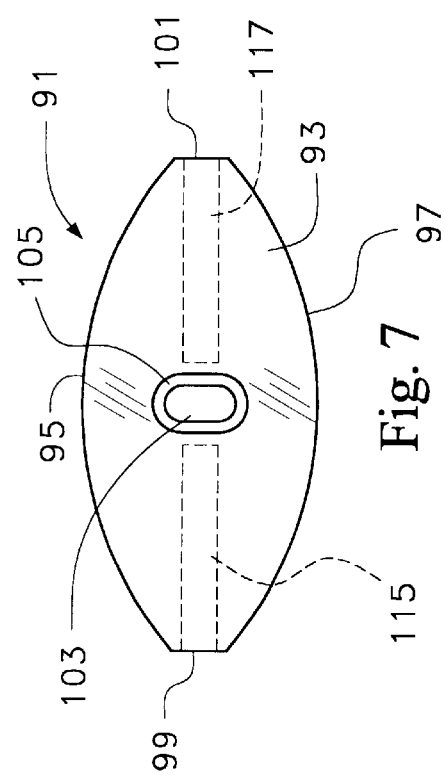
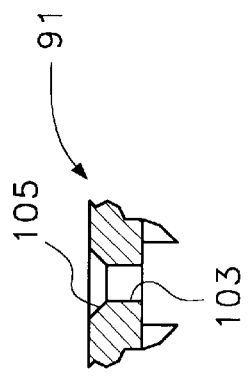
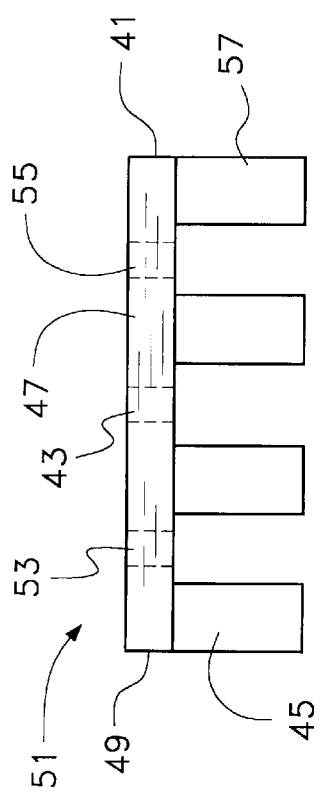
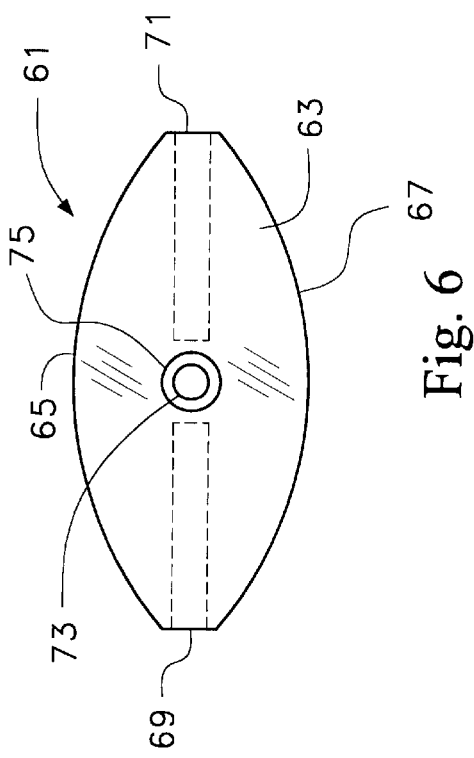

ANCHORING BISCUIT DEVICE

REFERENCE TO RELATED CASE

This is a continuation-in-part of U.S. patent application Ser. No. 08/811,898, now abandoned filed on Mar. 5, 1997 entitled, "Anchoring Biscuit Device for Joining Two Adjacent Boards", by the same inventor herein.

BACKGROUND OF THE INVENTION

1. Field of the Invention

The present invention is directed to an improved biscuit for joining adjacent boards. More specifically, the invention is an anchoring biscuit device, as well an anchoring half biscuit device which has the ability for pre-setting distances between adjacent boards and attaching to at least one board by means in addition to the biscuit itself. The anchoring biscuit device physically joins two adjacent boards in the same plane to a third, supporting board. The anchoring half-biscuit device joins two adjacent boards at right angles to one another.

2. Information Disclosure Statement

The following patents are representative of the state of the art for wood joining devices, equipment and methods:

U.S. Pat. No. 1,184,080 to D'Arcy describes a structure of the class described, the combination of frame pieces disposed at an angle to each other and plate-like corner irons having angularly disposed flanges, said corner irons being arranged in opposed pairs on the sides of and secured to the ends of meeting frame pieces with their flanges engaging the inner edges thereof in overlapping telescoping relation to each other, the inner flanges having vertical nail slots therein and brads on their edges driven into the frame pieces, the outer flanges having nail perforations opposite the nail slots, there being nails disposed through the said perforations and slots and driven into the frame.

U.S. Pat. No. 2,332,081 to G. M. Hunt et al is directed to a wooden panel. It is described as a panel comprising wooden strips joined along their edges with glue, each strip having at least one groove in its edge matching groove in the edge of the adjoining strip, an asbestos millboard spline fitted in the matching grooves and bridging the joint between the strips, crossbands covering the strips on both sides of the panel, and veneers covering the crossbands.

U.S. Pat. No. 2,362,252 to Ellinwood describes a wall structure of the character described comprising a pair of adjacent wallboard panels having meeting edges, each of said panels being formed with a groove opening into its meeting edge, the groove in each panel providing an outer lip and an inner lip, said outer lips being in abutting relation, a joining strip permanently secured to the under surface of said outer lips, said inner lips being spaced, a T-shaped connecting member movably positioned in said groove and having a base in spaced relation to said inner lips, and means for anchoring said connecting member to a structural element.

U.S. Pat. No. 2,398,603 to Soderberg describes a joining staple, comprising a metal body having at least two portions extending at right angles to each other and at least two teeth carried upon each of said portions, each of said teeth consisting of a flat substantially rectangular body having a cutting edge extending substantially parallel to its body portion, the cutting edges of all of said teeth being located in one plane, each of said portions having another cutting edge extending between the teeth of that portion, the second mentioned cutting edges being also located in one plane.

U.S. Pat. No. 2,406,387 to Lank describes the method of constructing a plurality of wooden posts each of which has a connector element incorporated therein adjacent each end thereof which method comprises forming a plurality of longitudinally extending grooves in one side of each of a pair of wooden blanks from which the posts are to be formed, forming a transverse groove adjacent each end of said side of each of said blanks with the transverse grooves intersecting the longitudinal grooves, providing a pair of connector retaining members with a plurality of seats for receiving connector elements, the number and spacing of said seats in each of said connector retaining members conforming to the number and spacing of the longitudinal grooves in each of said blanks, placing connector elements in each of said seats, positioning said blanks with their grooved sides together and with said connector retaining members in said transverse grooves, bonding said blanks together, and severing the thus bonded assembly along longitudinal lines intermediate said longitudinal grooves.

U.S. Pat. No. 4,641,988 to Ganner is directed to a fitting for releasably joining two structural components. It is illustrated for releasably joining two structural components particularly plate-shaped structural components which extend at a right angle relative to one another, a fitting has a preferably cylindrical locking element which can be inserted either directly in a bore in the first structural component or it can be inserted indirectly in a housing, and a holding piece with a holding projection anchored in the second structural component. In the assembled position, the holding projection & abuts against one or two gripping surfaces of the locking element which gripping surfaces are of, for example, eccentric shape, and the holding projection is pulled toward the locking element when the locking element is turned. The holding piece is constructed plate-shaped and is insertable in a slot in the second structural component.

U.S. Pat. No. 4,682,458 to Sparrow describes a floor composed of parallel spaced beams having flanges and blocks of polystyrene foam which are laid on the flanges to bridge the gaps between the beams. Boards are laid on the polystyrene blocks, and are supported by the blocks, which form load-bearing members of the floor. The blocks may have flanged portions extending over the beams, so as to provide heat insulation.

U.S. Pat. No. 5,004,027 to Legler et al illustrates a biscuit joiner. It is described as a biscuit joiner for cutting semi-elliptical slots in opposing edges of workpieces which are to be joined along those edges includes a housing adapted to be mounted upon the quill of a multi-purpose woodworking tool, which housing encloses a rotary saw blade adapted to be attached to a spindle projecting from the quill on which the housing is mounted. A spring loaded guide projects from the front face of the housing and has a slot therethrough, so that when the front face of the guide is engaged by an edge of a workpiece to be slotted the guide can be pushed inwardly against spring pressure, allowing the rotary saw blade to be exposed and form a slot in the edge of the workpiece. Adjustable stops are provided on the guide so that a desired depth of cut will automatically be made after adjustment. An alternative construction of this biscuit joiner is especially adapted for use in conjunction with a conventional drill press, with the arbor which carries the saw blade being clamped in the chuck on the drive spindle of the drill motor.

U.S. Pat. No. 5,182,891 to Slocum describes a flooring construction which is provided having a unitary construction with a top layer providing a finished flooring surface and an insulation layer adjacent the top layer. The flooring panel includes an upper portion and a lower portion. The upper portion has a larger dimension than the lower portion and extends outwardly beyond the lower portion. A recessed portion between the upper portion and the lower portion defines a channel. A plurality of interlock support elements having a vertical web and an upper horizontal flange are arranged so that the horizontal flange extends into the channel. The vertical web extends below the lower portion to raise the flooring.

U.S. Pat. No. 5,251,996 to Hiller et al describes a connecting element for connecting two parts generally in a connection plane has a first portion for connecting the element relative to a first of the parts and second portion for connecting the element relative to the second part. The second portion includes actuation members which on relative movement of the parts substantially along the connection plane urge the parts forcefully towards each other.

U.S. Pat. No. 5,377,732 to Fujii et al illustrates a wood joining structure and method thereof. It is described as a technique is provided for joining wood members. A plurality of slits are formed on the end portions of wood pieces desired to be joined, and the end portions are abutted with corresponding slits in alignment to form a common surface. Each of the abutted wood end portions is fixed by temporary fixing means to a desired joining state. Thereafter, an adhesive agent is applied into the interior surfaces of the slits. Connecting plates, e.g., made of a reinforced plastic material coated with the adhesive agent, are inserted into the aligned slits. The adhesive agent is then hardened.

U.S. Pat. No. 5,458,433 to Stastny explicates a biscuit and joint made using same. It is described as a biscuit having octagonal outer periphery is used to form a joint between first and second workpieces. The biscuit fits within arcuate slots formed in the workpieces, with glue placed in the slots and/or on the biscuit before the joint is put together. The biscuit is made of an anhydrous compressed wood.

U.S. Pat. No. 5,480,117 to Fleming, III describes a bracket for mounting a rotary lock member in the frame of a panel which is provided. The bracket is a preferably U-shaped body having a base and two legs extending therefrom. The inner dimension of the bracket is chosen to allow insertion of a rotary lock member therein. Panel engaging steps and protrusions are located on the outside surface of each leg for engaging the frame material. The legs of the bracket are biased inwardly towards one another, such that when a locking member is inserted therein, the legs are pressed outwardly, driving the protrusions into the frame material. A number of bores are located in the bracket to allow supplemental locking members to lock the bracket to the frame.

U.S. Pat. No. 5,529,428 to Bischof is directed to a metallic structural element for connecting workpieces consisting of wood, woodworking material or plastic. It is described as a metallic structural element for connecting workpieces consisting of wood, woodworking material or plastic, consisting of a lamellar part, which provides the non-positive connection with the first workpiece provided with a groove and a transverse hole, and a bolt-like part which, through screwing or pinning, realizes the non-positive connection with the second workpiece provided with a longitudinal hole. The lamellar part has, in the center, a hole which is at right angles to the plane of the lamella and is intended for fixing in the groove of the workpiece. Variants having a wing-like long or rectangular short lamellar part and a bolt-like part in the form of a conical wood screw, cylindrical screw, screw having a metal thread, threaded sleeve or pin. Accessories: screwing tool and drilling template.

U.S. Pat. No. 5,660,016 to Erwin et al describes an extruded plastic decking plank for mounting to an underlying support structure, the plank having a rigid foam core, a resilient outer plastic shell, and a clamping portion for securing the plank to the support structure. The top surface of the plank can be provided with a non-slip surface. The invention also includes an attachment system for securing such decking planks to a support structure by engaging the clamping portions of the decking planks onto clamps or hold down blocks which are secured onto the support structure, and which permit relative motion between the planks and the structure in the planks' lengthwise direction to prevent stress and buckling caused by uneven expansion.

Notwithstanding the prior art, the present invention is neither taught nor rendered obvious thereby.

SUMMARY OF THE INVENTION

The present invention is an anchoring biscuit device for joining three boards. It includes, (a) a first substantially flat horizontal top element having a generally biscuit-shaped top view configuration, (b) at least one substantially vertical support member attached to the underside of the top element and extending downwardly therefrom for a predetermined length for joinder of two adjacent boards which have been pre-cut with biscuit receiving slots, and, (c) an attachment orifice located at least on the top element for attachment of the anchoring biscuit device to a support board for anchoring and support of the two adjacent boards. In one preferred embodiment, a top bevel is included at the orifice to permit angled screwing at positions other than vertical positions. In other embodiments, the screw orifice will have an oval or elongated shape to likewise enable screwing at angles other than vertical. In yet another preferred embodiment, the orifice will both be beveled and elongated.

BRIEF DESCRIPTION OF THE DRAWINGS

The present invention should be more fully understood when the specification herein is taken in conjunction with the drawings appended hereto wherein:

FIG. 1 illustrates a top view of one preferred embodiment of the present invention anchoring biscuit device, FIG. 2 illustrates a front view, and FIG. 3 illustrates a side view thereof;

FIG. 4 shows a side view of the present invention device shown in FIGS. 1 through 3 but being attached to a joist and a first deck board and about to be attached to a second deck board where both deck boards are supported by that joist;

FIG. 5 shows a front view of an alternative embodiment present invention anchoring biscuit device;

FIGS. 6 and 7 show top views of alternative present invention anchoring biscuit devices;

FIG. 8 shows a partial side cut view of the device shown in FIG. 7 to illustrate the beveled cut of the screw hole;

DETAILED DESCRIPTION OF THE PRESENT INVENTION

Figure 10:
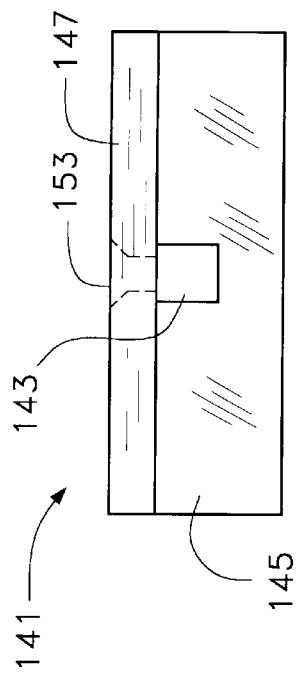

In FIG. 1, there is shown a top view of present invention anchor biscuit device 1. Device 1 includes a top element 3 having a flat top surface as shown, and a top view shape of a biscuit. Thus, it includes walls 5 and 7 in the shape of arcs having predetermined radius and predetermined arc lengths. In this case, they are perfectly symmetrical and have flat endwalls 9 and 11. Without exceeding the scope of the present invention, these biscuit shapes could be slightly modified, such as having slightly non-circular arcs or linear segments at angles approximating arcs.

Top element 3 also includes an attachment means, in this case, screw hole 13 located on center. This enables the user to nail or screw device 1 into a joist, as more fully described in conjunction with FIG. 4 below.

FIGS. 2 and 3 show front and end (right side) views, respectively of device 1 shown in FIG. 1. Thus, device 1 includes vertical support members 15 and 17 with a space therebetween to permit a screw or nail to pass through screw hole 13 into a joist or support board. Vertical support members 15 and 17 have a predetermined height so as to rest on a joist in such a way as to establish biscuit top element 3 at a predetermined height from the joist for attachment of two adjacent boards thereto which have pre-cut biscuit slots corresponding thereto.

FIG. 4 shows present invention device 1 with identical parts identically numbered. Top element rear biscuit wall 5 is inserted into pre-cut biscuit slot 27 of horizontal beam 21, as shown. Screw 31 is inserted into screw hole 13 and into joist beam 25. This anchors device 1 to joist beam 25 and establishes the elevation of top element 3 so as to match with biscuit slot 27. Beam 23 will be placed atop joist 25 and adjacent to beam 21 by being slid into position with wall 7 fitting into slot 29 and the bottom of beam 23 resting on joist 25. By this method, device 1 attaches all three boards to one another as the biscuit aspects are typically tight-fitting. Thus, for example, decking boards may be attached without the need for nails or screws entering the beams from the top.

FIG. 5 shows an alternative embodiment present invention device 51 which has multiple screw holes 43, 53 and 55 located in a straight line on center of top element 47. It includes ends 41 and 49, and it has a plurality of vertical support members such as vertical support members 45 and 57, with spaces therebetween for screw or nail insertions. Device 51 is used in the same manner as device 1 described above with respect to FIG. 4.

FIGS. 6 and 7 show top views of alternative embodiment present invention anchoring biscuit devices 61 and 91 respectively. In FIG. 6, there is shown a top view of present invention anchor biscuit device 61. Device 61 includes a top element 63 having a flat top surface as shown, and a top view shape of a biscuit. Thus, it includes walls 65 and 67 in the shape of arcs having predetermined radius and predetermined arc lengths. In this case, they are perfectly symmetrical and have flat endwalls 69 and 71. Top element 63 also includes an attachment means, in this case, screw hole 73 located on center. Screw hole 73 has a bevel cut 75 at its top. This enables the user to nail or screw device 61 into a joist with the screw or nail being installed vertically, or, more preferably, at an angle.

In FIG. 7, there is shown a top view of present invention anchor biscuit device 91. Device 91 includes a top element 93 having a flat top surface as shown, and a top view shape of a biscuit. Thus, it includes walls 95 and 97 in the shape of arcs having predetermined radius and predetermined arc lengths. In this case, they are perfectly symmetrical and have flat endwalls 99 and 101. Top element 93 also includes an attachment means, screw hole 103 located on center. Note that screw hole 103 is elongated and has a beveled top 105.

This enables the user to nail or screw device 91 into a joist, either vertically or at an angle, as more fully described in conjunction with FIG. 8 below.

FIG. 8 shows a partial side cut view of device 91 of FIG. 7 to illustrate the beveled cut 105 of screw hole 103.

Figure 9:
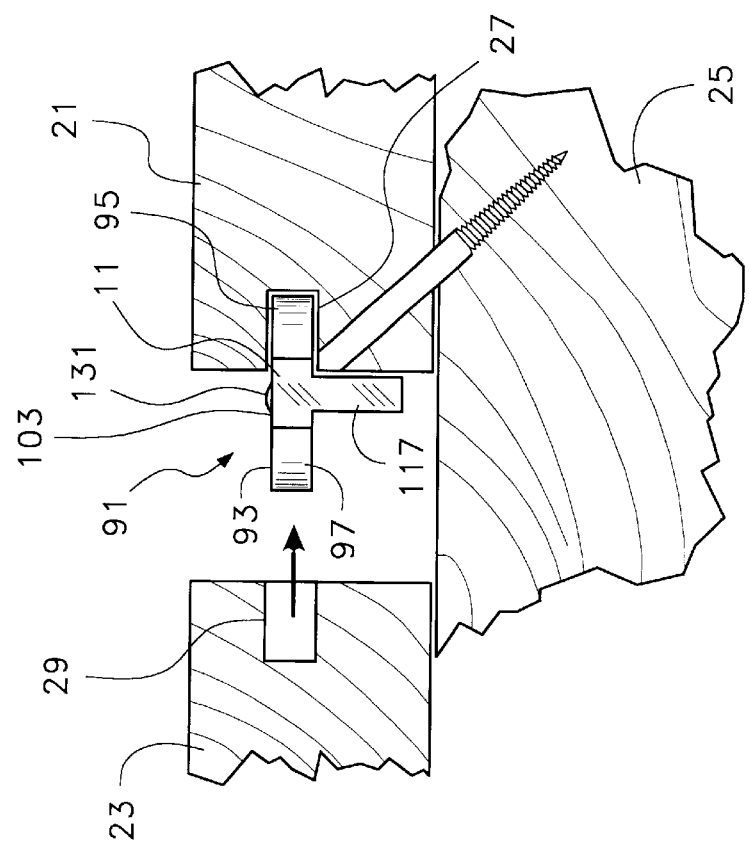
FIG. 9 shows a side view of the present invention device shown in FIG. 7, but being attached to a joist and a first deck board and about to be attached to a second deck board where both deck boards are supported by that joist; and, FIG. 10 and FIG. 11 show front views of alternative embodiment present invention anchoring biscuit devices having single vertical extended members.

FIG. 9 shows present invention device 91 of FIG. 7 and the boards shown in FIG. 4, with identical parts identically numbered. Top element 93 at rear biscuit wall 95 is inserted into pre-cut biscuit slot 27 of horizontal beam 21, as shown. Screw 131 is inserted at about a 30° angle from vertical into beveled screw hole 103 and into horizontal beam 21 and joist beam 25. This anchors device 91 and horizontal beam 21 to joist beam 25 and support member 117 (and 115 not shown) maintains top element 93 in a horizontal position during screwing and to maintain its position with biscuit slot 27. Beam 23 will be placed atop joist 25 and adjacent to beam 21 by being slid into position with wall 97 fitting into slot 29 and the bottom of beam 23 resting on joist 25. By this method, device 91 attaches all three boards to one another as the biscuit aspects are typically tight-fitting. The steps are repaeated along each joint beam in a deck and they are repeated for each next horizontal beam to assemble, e.g., a deck, platform, porch, etc.

FIG. 10 shows a front view of device 141. Thus, device 141 includes a single vertical support member 145 with a space cut out 143 to permit a screw or nail to pass through beveled screw hole 153 and through support member 145 into a joist or support board. Vertical support member 145 has a predetermined height so as to rest on the side of a beam into which device 141 may be inserted and, optionally, so as to rest on a joist in such a way as to establish biscuit top element 147 at a predetermined height from the joist for attachment of two adjacent boards thereto which have pre-cut biscuit slots corresponding thereto.

Figure 11:
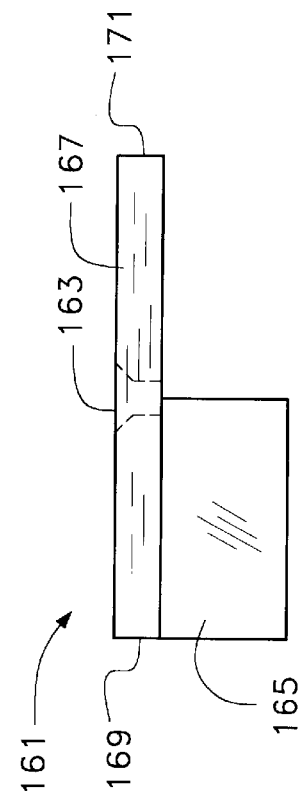

FIG. 11 shows a front view present invention of device 161, which includes a single off-center vertical support member 165 with a space underneath beveled screw hole 163 to permit a screw or nail to pass through screw hole 163 into a beam and/or joist or support board. Top 167 has opposite ends 169 and 171 as shown, with support member 165 biased to the left toward end 169, as shown. Top 163 may have a topography which would be the same as that shown in FIGS. 1, 6 or 7 above.

Obviously, numerous modifications and variations of the present invention are possible in light of the above teachings. It is therefore understood that within the scope of the appended claims, the invention may be practiced otherwise than as specifically described herein.

What is claimed is:

1. An anchoring biscuit device for joining three boards, which comprises:
 (a) a first substantially flat horizontal top element having a generally biscuit-shaped top view configuration with opposite side walls in the shape of arcs from a top view, said arcs having predetermined radii and arc lengths, said top element having a center area between said opposite side walls in the shape of arcs;
 (b) at least two substantially vertical support members attached to an underside of said top element at said center area of said top element and extending downwardly therefrom for a predetermined length to maintain said top element in a predetermined position during use for joining two adjacent boards which have been pre-cut with biscuit receiving slots, two of said at least two vertical support members being substantially flat, being in the same plane and one of each being located on opposite sides of an attachment orifice; and, (c) at least one attachment orifice located at least on said top element for attachment of said anchoring biscuit device to a support board for anchoring and support of said two adjacent boards.

2. The anchoring biscuit device of claim 1 wherein said attachment orifice is at least one screwhole located on said top element for screwing of said anchoring biscuit device to a support board.

3. The anchoring biscuit device of claim 2 wherein said screwhole has a bevelled top.

4. The anchoring biscuit device of claim 2 wherein said screwhole is non-circular and elongated.

5. The anchoring biscuit device of claim 1 wherein said attachment orifice has a bevelled top.

6. The anchoring biscuit device of claim 1 wherein said attachment orifice is non-circular and elongated.

7. The anchoring biscuit device of claim 1 wherein said top element and said vertical support member are unitarily formed.

8. The anchoring biscuit device of claim 1 wherein there are two vertical support members and one is located on each side of said attachment orifice.

9. The anchoring biscuit device of claim 8 wherein said top element and said two vertical support members are all unitarily formed.

10. An anchoring biscuit device for joining three boards, which comprises:

(a) a first substantially flat horizontal top element having a generally biscuit-shaped top view configuration with opposite side walls in the shape of arcs from a top view, said arcs having predetermined radii and arc lengths, said top element having a center area between said opposite side walls in the shape of arcs;

(b) at least one substantially vertical support member attached to an underside of said top element at said center area of said top element and extending downwardly therefrom for a predetermined length to maintain said top element in a predetermined position during use for joining two adjacent boards which have been precut with biscuit receiving slots, said at least one vertical support member being substantially flat; and, (c) at least one attachment orifice located at least on said top element for attachment of said anchoring biscuit device to a support board for anchoring and support of said two adjacent boards;

wherein there is one substantially vertical support member which is located off-center and to one side of said attachment orifice.

11. The anchoring biscuit device of claim 10 wherein said attachment orifice has a bevelled top.

12. The anchoring biscuit device of claim 10 wherein said attachment orifice is non-circular and elongated.

* * * * *

EX PARTE REEXAMINATION CERTIFICATE (6264th)
United States Patent
Eberle, III

(10) Number: US 6,402,415 C1
(45) Certificate Issued: Jun. 17, 2008

(54) ANCHORING BISCUIT DEVICE

(75) Inventor: Harry W. Eberle, III, Califon, NJ (US)

(73) Assignee: Blue Heron Enterprises, LLC, Califon, NJ (US)

Reexamination Request:
No. 90/007,661, Aug. 8, 2005

Reexamination Certificate for:
Patent No.: 6,402,415
Issued: Jun. 11, 2002
Appl. No.: 09/186,741
Filed: Nov. 5, 1998

Related U.S. Application Data

(63) Continuation-in-part of application No. 08/811,898, filed on Mar. 5, 1997, now abandoned.

(51) Int. Cl.
*B25G 3/00* (2006.01)

(52) U.S. Cl. .............. 403/231; 403/232.1; 403/408.1; 52/483.1

(58) Field of Classification Search .......... D8/382, D8/354, 349; D25/199; 403/230, 231, 232.1, 403/298, 294, 401, 408.1; 248/300, 309.1; 52/408, 483.1, 506.05, 586.1, 586.2, 585.1, 52/772
See application file for complete search history.

(56) References Cited

U.S. PATENT DOCUMENTS

| | | | |
|---|---|---|---|
| 695,722 | A | 3/1902 | Heilmann |
| 1,714,738 | A | 5/1929 | Smith |
| 2,201,129 | A | 5/1940 | Weiland |
| 2,337,156 | A | 12/1943 | Elmendorf |
| 5,619,834 | A | 4/1997 | Chen |

FOREIGN PATENT DOCUMENTS

| DE | 372483 | | 3/1923 |
|---|---|---|---|
| JP | 404371657 A | * | 12/1992 |

* cited by examiner

*Primary Examiner*—Jeffrey R. Jastrzab

(57) ABSTRACT

An anchoring biscuit device for joining three boards. It includes, (a) a first substantially flat horizontal top element having a generally biscuit-shaped configuration, (b) at least one substantially vertical support member attached to the underside of the top element and extending downwardly therefrom for a predetermined length for joinder of two adjacent boards which have been pre-cut with biscuit receiving slots, and, (c) an attachment orifice located at least on the top element for attachment of the anchoring biscuit device to a support board for anchoring and support of the two adjacent boards. In one preferred embodiment, a top bevel is included at the orifice to permit angled screwing at positions other than vertical positions. In other embodiments, the screw orifice will have an oval or elongated shape to likewise enable screwing at angles other than vertical. In yet another preferred embodiment, the orifice will both be beveled and elongated.

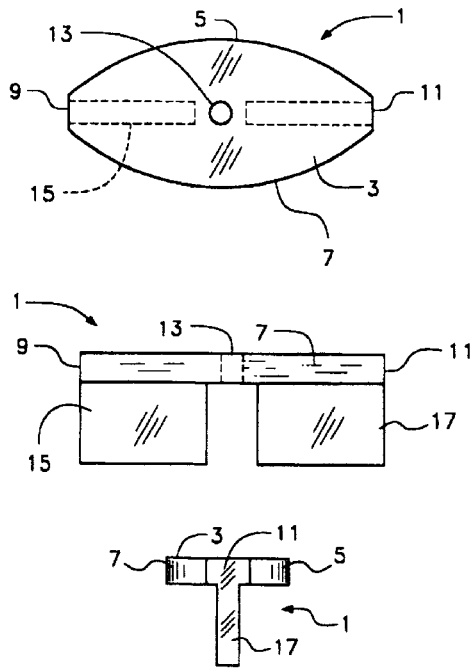

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 2, 7, 8 and 10 are determined to be patentable as amended.

Claims 3–6, 9, 11 and 12, dependent on an amended claim, are determined to be patentable.

New claims 13–26 are added and determined to be patentable.

1. An anchoring biscuit device for joining [three] *together* two adjacent boards *and a support board, the adjacent boards being in the same plane and having in their sides pre-cut biscuit receiving slots*, [which comprises] *the anchoring biscuit device comprising*:
   (a) a first substantially flat horizontal top element having a generally biscuit-shaped top view configuration [with] *having* opposite side walls in the shape of arcs from a top view, said arcs having predetermined radii and arc lengths, *and opposite end walls*, said top element having a center [area between said opposite side walls in the shape of arcs] *line extending between said end walls, and said respective side walls being adapted to be fitted into said respective biscuit receiving slots of said adjacent boards*;
   (b) at least two substantially vertical support members attached to an underside of said top element [at] *along* said center [area] *line* of said top element and extending *perpendicularly* downwardly [therefrom] *from said top element* for a predetermined length *in a vertical plane that is aligned with, and directly under, said center line, said predetermined length being adapted* to maintain said top element in a predetermined position during use for joining *said* two adjacent boards *together with, and atop, said support board*, [which have been pre-cut with biscuit receiving slots, two of] *all of* said at least two vertical support members being substantially flat[, being] *and* in [the same] *said vertical* plane [and one of each being located on opposite sides of an attachment orifice]; and,
   (c) at least one attachment orifice located at least on said top element for attachment of said anchoring biscuit device to [a] *said* support board for anchoring and support of said two adjacent boards, *said attachment orifice being located between two of said vertical support members*.

2. The anchoring biscuit device of claim 1 wherein said attachment orifice is at least one screwhole located on said top element for screwing of said anchoring biscuit device to [a]*said* support board.

7. The anchoring biscuit device of claim 1 wherein said top element and said vertical support [member] *members* are unitarily formed.

8. The anchoring biscuit device of claim 1 wherein there are *exactly* two vertical support members [and one is located on each side of said attachment orifice].

10. An anchoring biscuit device for joining [three] *together two adjacent* boards *and a support board, the adjacent boards being in the same plane and having in their sides pre-cut biscuit receiving slots*, [which comprises] *the anchoring biscuit device comprising*:
   (a) a first substantially flat horizontal top element having a generally biscuit-shaped top view configuration with opposite side walls in the shape of arcs from a top view, said arcs having predetermined radii and arc lengths, *and opposite end walls*, said top element having a center [area between said opposite side walls in the shape of arcs] *line extending between said end walls, and said respective side walls being adapted to be fitted into said respective biscuit receiving slots of said adjacent boards*;
   (b) at least one substantially vertical support member attached to an underside of said top element [at] *along* said center [area] *line* of said top element and extending *perpendicularly* downwardly therefrom for a predetermined length *in a vertical plane that is aligned with, and directly under, said center line, said predetermined length being adapted* to maintain said top element in a predetermined position during use for joining *said* two adjacent boards [which have been precut with biscuit receiving slots] *together with, and atop, said support board*, said at least one vertical support member being substantially flat; and,
   (c) at least one attachment orifice located at least on said top element for attachment of said anchoring biscuit device to a support board for anchoring and support of said two adjacent boards; *and*
   wherein [there is] *said at least* one substantially vertical support member [which] is located off-center and to one side of said *at least one* attachment orifice.

13. *The anchoring biscuit device of claim 10 having exactly one said vertical support member.*

14. *An anchoring biscuit device for joining together two adjacent boards and a support board, the adjacent boards being in the same plane and having in their sides pre-cut biscuit receiving slots, the anchoring biscuit device comprising:*
   (a) *a first substantially flat horizontal top element having a generally biscuit-shaped top view configuration having opposite side walls in the shape of arcs from a top view, said arcs having predetermined radii and arc lengths, and opposite end walls, said top element having a center line extending between said end walls, and said respective side walls being adapted to be fitted into said respective biscuit receiving slots of said adjacent boards;*
   (b) *exactly two substantially vertical support members attached to an underside of said top element along said center line of said top element and extending perpendicularly downwardly therefrom for a predetermined length in a vertical plane that is aligned with, and directly under, said center line, said predetermined length being adapted to maintain said top element in a predetermined position during use for joining said two adjacent boards together with, and atop, said support board, said vertical support members being substantially flat and in said vertical plane; and*
   (c) *at least one attachment orifice located on said top element for attachment of said anchoring biscuit device* to said support board for anchoring and support of said two adjacent boards, said attachment orifice being located between said vertical support members.

15. The anchoring biscuit device of claim 14 wherein said attachment orifice is at least one screwhole located on said top element for screwing of said anchoring biscuit device to said support board.

16. The anchoring biscuit device of claim 15 wherein said screwhole has a bevelled top.

17. The anchoring biscuit device of claim 15 wherein said screwhole is non-circular and elongated.

18. The anchoring biscuit device of claim 14 wherein said top element and said vertical support member are unitarily formed.

19. The anchoring biscuit device of claim 14, having exactly one said attachment orifice.

20. An anchoring biscuit device for joining together two adjacent boards and a support board, the adjacent boards being in the same plane and having in their sides pre-cut biscuit receiving slots, and wherein the anchoring biscuit device comprises:

(a) a first substantially flat horizontal top element having a generally biscuit-shaped top view configuration with opposite side walls in the shape of arcs from a top view, said arcs having predetermined radii and arc lengths, and opposite end walls, said top element having a center line extending between said end walls, and said respective side walls being adapted to be fitted into said respective biscuit receiving slots of said adjacent boards;

(b) exactly one substantially vertical support member attached to an underside of said top element along said center line of said top element and extending perpendicularly downwardly therefrom for a predetermined length in a vertical plane that is aligned with, and directly under, said center line, said predetermined length being adapted to maintain said top element in a predetermined position during use for joining said two adjacent boards together with, and atop, said support board, said at least one vertical support member being substantially flat; and, (c) at least one attachment orifice located at least on said top element for attachment of said anchoring biscuit device to a support board for anchoring and support of said two adjacent boards; and wherein said substantially vertical support member is located off-center and to one side of said at least one attachment orifice.

21. The anchoring biscuit device of claim 20 wherein said attachment orifice is at least one screwhole located on said top element for screwing of said anchoring biscuit device to said support board.

22. The anchoring biscuit device of claim 21 wherein said screwhole has a bevelled top.

23. The anchoring biscuit device of claim 21 wherein said screwhole is non-circular and elongated.

24. The anchoring biscuit device of claim 20 wherein said top element and said vertical support member are unitarily formed.

25. The anchoring biscuit device of claim 20, having exactly one said attachment orifice.

26. The anchoring biscuit device of claim 25, wherein said attachment orifice is situtated on said center line.

* * * * *